United States Patent [19]

Shimamura et al.

[11] E Re. 30,064

[45] Reissued Aug. 7, 1979

[54] PROCESS FOR COLOR PHOTOGRAPHIC PROCESSING

[75] Inventors: Isao Shimamura; Junkiti Ogawa, both of Minami-ashigara, Japan

[73] Assignee: Fuji Photo Film Co., Ltd., Minami-ashigara, Japan

[21] Appl. No.: 921,677

[22] Filed: Jul. 3, 1978

Related U.S. Patent Documents

Reissue of:

[64] Patent No.: 4,083,723
Issued: Apr. 11, 1978
Appl. No.: 771,492
Filed: Feb. 24, 1977

[30] Foreign Application Priority Data

Feb. 24, 1976 [JP] Japan ..... 51-19215
Sep. 29, 1976 [JP] Japan ..... 51-117036

[51] Int. Cl.[2] ..... G03C 5/30
[52] U.S. Cl. ..... 96/66.5; 96/56
[58] Field of Search ..... 96/66 R, 22, 56, 66.3, 96/66.4, 66.5

[56] References Cited

U.S. PATENT DOCUMENTS

| | | | |
|---|---|---|---|
| 2,875,049 | 2/1959 | Kridel | 96/66.4 |
| 3,201,246 | 8/1965 | Allen et al. | 96/66.4 |
| 3,933,427 | 1/1976 | Bohnsack et al. | 252/87 |
| 3,982,945 | 9/1976 | Willems | 96/66 R |

FOREIGN PATENT DOCUMENTS

| | | | |
|---|---|---|---|
| 1045373 | 12/1958 | Fed. Rep. of Germany | 96/66.4 |

*Primary Examiner*—Mary F. Kelley
*Attorney, Agent, or Firm*—Sughrue, Rothwell, Mion, Zinn and Macpeak

[57] ABSTRACT

A process for color photographic processing, which comprises subjecting an exposed silver halide color light-sensitive material to a color development using a color developer containing (1) an aromatic primary amine developing agent and
(2) at least one organic compound having at least one phosphono group and at least one carboxy group in the molecule.

11 Claims, No Drawings

PROCESS FOR COLOR PHOTOGRAPHIC PROCESSING

Matter enclosed in heavy brackets [ ] appears in the original patent but forms no part of this reissue specification; matter printed in italics indicates the additions made by reissue.

BACKGROUND OF THE INVENTION

1. FIELD OF THE INVENTION

The present invention relates to a process for color photographic processing and, more particularly, to a process for color photographic processing using a color developer which is stable even in the presence of heavy metal ions.

2. DESCRIPTION OF THE PRIOR ART

In the field of color photography, cyan, yellow, magenta or like couplers are incorporated in a silver halide emulsion using various methods, and coated on a support to prepare a color photographic material, which is image-wise exposed and subjected to a series of photographic processing steps for forming images therein.

The fundamental steps in photographic processing are a color-developing step and a silver-removal step. In the color-developing step, silver halide in an exposed silver halide color photographic material is reduced with a color developing agent to form a silver image and, at the same time, an oxidized color developing agent reacts with the couplers to provide dye images. Then, the color photographic material is subjected to a silver-removal step to oxidize the silver formed in the preceding step with an oxidizing agent (usually called a "bleaching agent"). The thus oxidized silver is then dissolved with a complexing agent for silver ion usually called "a fixing agent" to remove the silver from the photographic material. Thus, the photographic material contains only dye images. In practical development processing, auxiliary steps are involved, in addition to the above-described fundamental steps of color development and silver removal, for maintaining the photographic and physical properties of the images or for improving the storage stability of the images.

For example, the steps of a hardening bath for preventing the light-sensitive film from being softened too much during processing, a stopping bath for effectively stopping the development reaction, an image-stabilizing bath for stabilizing the resulting images, and a delamination bath for removing a backing layer of the support are illustrative of these additional steps.

Developing agents used in a color developer are generally aromatic primary amines, in particular, p-phenylenediamine derivatives. Typical examples thereof include N,N-diethyl-p-phenylenediamine, 4-diethylamino-2-methylaniline, 2-methyl-4-[N-ethyl-N-(β-hydroxyethyl)amino]aniline, 2-methyl-4-[N-ethyl-N-(β-hydroxyethyl)amino]aniline, etc.

A large amount of sulfite cannot be used as a preservative (antioxidant) in a color developer containing these aromatic primary amines as developing agent in contrast to the situation with a black-and-white developer containing an N-alkyl-p-aminophenol or hydroquinone as a developing agent. The reason is a large amount of sulfite seriously inhibits the coloration reaction between the aromatic primary amine developing agent and the color coupler. Therefore, in a color developer containing an aromatic primary amine as a developing agent, hydroxylamine is generally used as an antioxidant together with sulfite. However, serious decomposition of hydroxylamine occurs in the presence of a slight amount of heavy metal ion, for example, iron ion or copper ion. Therefore, in a color developer containing hydroxylamine as a preservative, a sequestering agent for heavy metal ions is indispensable.

Aminopolycarboxylic acids, such as nitrilotriacetic acid, ethylenediaminetetraacetic acid, etc., are known as sequestering agents for heavy metal ions. However, they have the defect that they themselves accelerate the decomposition of hydroxylamine, 1,3-Diamino-2-propanoltetraacetic acid described in U.S. Pat. No. 2,875,049 and diethylenetriaminepentaacetic acid described in U.S. Pat. No. 3,462,269 are not satisfactory, although they cause hydroxylamine to decompose to a comparatively lower extent. Therefore, a chelating agent which can be used as a replacement for aminopolycarboxylic acids has been desired.

As a chelating agent other than aminopolycarboxylic acids, organic phosphonic acid compounds are disclosed in West German Patent application (OLS) No. 2,227,639. However, these compounds do not possess sufficient masking ability for heavy metal ions. In addition, the masking capability for calcium ion is also insufficient. Further, since they form chelate compounds with calcium which are slightly soluble in water, the presence of calcium ion in a developer would lead to formation of a precipitate. The above-described organic phosphonic acid compounds contain phosphorus in such a large amount that, when discharged in waste water, they increase the phosphorus content in rivers and the sea and thus result in pollution. Therefore, a chelating agent which possesses a large masking power for heavy metal ions and calcium ion, which does not form any precipitate with calcium ion, and which pollutes nature due to phosphorus to a lesser extent has been desired.

SUMMARY OF THE INVENTION

An object of the present invention is to provide a process of color photographic processing for obtaining color photographic images using a color developer wherein hydroxylamine present in the developer as a preservative is sufficiently protected from the acceleration of decomposition due to the presence of heavy metals, such as iron, copper, etc.

Another object of the present invention is to provide a color developer which does not form any precipitate nor form a milky turbidity, and a process of color photographic processing for obtaining color photographic images using this color developer.

A further object of the present invention is to provide a process of color photographic processing using a color developer which causes less pollution due to phosphorus and which is sufficiently protected from heavy metal ions and calcium ion.

It has now been found that the above-described objects of the present invention can be attained by processing a silver halide color light-sensitive material with a color developer containing:

(1) an aromatic primary amine developing agent;

(2) at least one organic phosphonocarboxylic acid compound; and (3) optionally, a preservative, such as hydroxylamine.

DETAILED DESCRIPTION OF THE INVENTION

The above-described organic phosphonocarboxylic acid compound contains at least one, preferably one or two, phosphono groups, —$PO(OM)_2$, and at least one, preferably two or three, carboxy groups, —$COOM^1$, (wherein M and $M^1$, which may be the same or different, each represents a hydrogen atom, an ammonium group or an alkali metal atom (e.g., sodium, potassium, lithium, etc.)).

Phosphonocarboxylic acid compounds which are used preferably for the present invention include compounds represented by the following general formula:

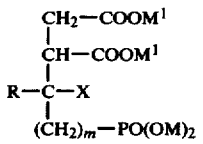

wherein X represents —$COOM^1$ or —$PO(OM)_2$, in which M and $M^1$, which may be the same or different, each represents a hydrogen atom, an alkali metal atom (e.g., sodium, potassium, lithium, etc.) or an ammonium ($NH_4^+$) group, R represents a hydrogen atom, an alkyl group having 1 to 4 carbon atoms (e.g., methyl, ethyl, butyl, etc.) or a phenyl group, m represents 0 or 1, and R preferably represents a hydrogen atom or a methyl group.

Specific examples of compounds within the above general formula and other compounds which are useful are illustrated below.

(1) 1-Phosphonopropane-1,2,3-tricarboxylic acid
(2) 1-Phosphonobutane-2,3,4-tricarboxylic acid
(3) 1,1-Diphosphonopropane-2,3-dicarboxylic acid
(4) 2-Phosphonobutane-2,3,4-tricarboxylic acid
(5) 2,2-Diphosphonobutane-3,4-dicarboxylic acid
(6) 2-Phosphonobutane-1,2,4-tricarboxylic acid Details relative to these compounds are described in Japanese Patent Application (OPI) No. 49887/74 and West German Patent Application (OLS) No. 2,015,068.

More specifically, Japanese Patent Application (OPI) 49887/74 describes the preparation of various phosphonocarboxylic acids as set forth briefly below.

1-Phosphonopropane-1,2,3-tricarboxylic acid can be prepared as follows: Maleic acid ester is reacted with phosphonoacetic acid ester in the presence of an alcoholate, and then the thus obtained ester is hydrolyzed so as to obtain 1-phosphonopropane-1,2,3-tricarboxylic acid.

1-Phosphonobutane-2,3,4-tricarboxylic acid can be prepared as follows: Dimethyl phosphite is reacted with 1-butene-2,3,4-tricarboxylic acid ester in the presence of sodium alcoholate, and then the thus obtained ester is hydrolyzed so as to obtain 1-phosphonobutane-2,3,4-tricarboxylic acid.

In the presence of a sodium alcoholate, methylene diphosphonic acid alkyl ester is reacted with maleic acid alkyl ester so as to produce an ester which can be converted to 1,1-diphosphonopropane-2,3-dicarboxylic acid by acid hydrolysis.

2-Phosphonobutane-2,3,4-tricarboxylic acid can be obtained as follows: In the presence of an alcoholate, α-diethylphosphonopropionic acid methyl ester is reacted with maleic acid diethyl ester, and then the thus obtained ester is hydrolyzed so as to obtain 2-phosphonobutane-2,3,4-tricarboxylic acid.

2,2-Diphosphonobutane-3,4-dicarboxylic acid can be obtained as follows: In the presence of sodium alcoholate, maleic acid ester is reacted with ethane-1,1-diphosphonic acid ester, and then the thus obtained product is acid hydrolyzed so as to obtain 2,2-diphosphonobutane-3,4-dicarboxylic acid.

The details of the preparation of 2-phosphono-1,2,4-tricarboxylic acid are described in West German Patent Application (OLS) No. 2,015,068.

The thus [obtain] *obtained* phosphonic acids can be converted to the salts thereof by neutralization with alkali metal hydroxide, ammonium hydroxide or mono-, di- and tri-ethanolamine using well-known methods.

The organic phosphonocarboxylic acid compounds used in accordance with the present invention markedly increase the stability of a color developer containing hydroxylamine and sulfite as antioxidants. In particular, they markedly depress the decomposition of hydroxylamine even in the presence of heavy metal ions such as iron ion or copper ion, and hence markedly less fog results when an other than fresh developer is used.

Additionally, the organic phosphonocarboxylic acid compounds of the present invention can be used to improve the stability of a color developer containing other antioxidants than hydroxylamine such as ascorbic acid, tetronic acid, tetronimide, 2-anilinoethanol, dihydroxyacetone, sugars such as pentoses and hexoses or the like and to reduce fog formed when an other than fresh developer is used.

In general, color development of color photographic light-sensitive materials involves some fogging. This fogging is called "development fog", which can be prevented by adding halides such as potassium bromide or potassium iodide or organic antifogging agents such as 1-phenyl-5-mercaptotetrazole, benzotriazole, or 5-nitrobenzimidazole to the developer. However, when an other than fresh color developer is used, a fog called "color fog" or "stain" which is different from development fog is formed. This fog cannot be prevented by the addition of the above-described halides or organic antifogging agents. (In this specification, "fog" means this type of fog, unless otherwise specified).

This fog increases as the developing temperature increases, and becomes serious in high temperature processing (e.g., about 30° C. or above). Acceleration of the deterioration of a color developer as the developing temperature increases is considered to be one of the causes. Therefore, generation of this fog seems to be closely related with the storage stability of a color developer. In particular, the oxidation products formed as a result of a color developing agent being partly oxidized with the lapse of time, or the decomposition products of compounds added as preservatives (e.g., hydroxylamine) are considered to be the main causes. Such oxidation products of the developing agent are considered to be oxidation products of the color developing agents (semiquinone or quinonediimine), quinonemonoimine which has undergone a deamination reaction, the oxidation products thereof, quinonemonoimine sulfite adducts, etc. On the other hand, hydrogen peroxide is included as a peroxide formed as a by-product. For example, some of these oxidation products undergo a coupling reaction with couplers in a light-sensitive material to form dyes, which might be the cause of fogging.

Such fog appears in the unexposed areas (where no dyes should be formed) to impair whiteness or transparency. In addition, when only one or two layers of the photographic emulsions in a light-sensitive material should effectively be exposed, such fog is undesirably formed in other layer or layers, resulting in color stain of the formed color images. For example, where only a red-sensitive layer should effectively be exposed, fog is undesirably formed in a green-sensitive layer and a blue-sensitive layer to cause a magenta and yellow coloration of this respective layers, although only a cyan color dye should essentially be formed, thus providing cyan color images having less color purity. Such color fog in the white areas and color mixing in the color image areas seriously degrades the quality of the resulting photographic images.

The color developer of the present invention effectively prevents such color fog and color mixing caused by this color fog.

The phosphonocarboxylic acid compounds used in the present invention do not require the use of lithium salts or aminopolycarboxylic acids which is different from organic phosphonic acids. This effect is not at all predictable from the prior art.

In the present invention, the organic phosphonocarboxylic acid compounds can be used in the range of from about 0.01 g to about 50 g, preferably from 0.05 g to 20 g, particularly preferably from 0.1 g to 10 g, per liter of the color developer.

In the present invention, aminopolycarboxylic acids such as ethylenediaminetetraacetic acid, nitrilotriacetic acid, diethylenetriaminepentaacetic acid, triethylenetetraminehexaacetic acid, etc., or catechol derivatives, such as tiron may be used, if desired, in combination with the organic phosphonocarboxylic acid of this invention without the adverse effect, which is observed where such aminopolycarboxylic acids are used alone, occurring. Where the phosphonocarboxylic acid is used in combination with an aminopolycarboxylic acid, a suitable mole ratio of the aminopolycarboxylic acid to the phosphonocarboxylic acid is about 0.1:1 to about 10:1.

In the present invention, the pH of the color developer may range from about 7 to about 14, preferably about 8 to 13, particularly preferably 8.5 to 12.5.

In the present invention, the color developer can be used at a temperature of about 20° C. to about 80° C., preferably 30° C. to 60° C.

The color developer used in the present invention has the same composition as that of a conventional color developer containing an aromatic primary amine developing agent except for the presence of the organic phosphonocarboxylic acid which is the characteristic aspect of the present invention. Preferred examples of suitable aromatic primary amine color developing agents are p-phenylenediamine derivatives, such as N,N-diethyl-p-phenylenediamine hydrochloride, 2-amino-5-diethylaminotoluene hydrochloride, 2-amino-5-(N-ethyl-N-laurylamino)toluene, 4-[N-ethyl-N-(β-hydroxyethyl-)amino]aniline sulfate, 2-methyl-4-[N-ethyl-N-(β-hydroxyethyl)amino]aniline sulfate, N-ethyl-N-(β-methanesulfoamidoethyl)-3-methyl-4-aminoaniline sesquisulfate monohydrate as described in U.S. Pat. No. 2,193,015, N-(2-amino-5-diethylaminophenylethyl)methanesulfonamide sulfate as described in U.S. Pat. No. 2,592,364, N,N-dimethyl-p-phenylenediamine hydrochloride, 4-amino-3-methyl-N-ethyl-N-methoxyethylaniline as described in U.S. Pat. Nos. 3,656,950, 3,698,525, etc., 4-amino-3-methyl-N-ethyl-N-β-ethoxyethylaniline, 4-amino-3-methyl-N-ethyl-N-β-butoxyethylaniline, the salts thereof (e.g., the sulfates, hydrochlorides, sulfites, p-toluenesulfonates, etc.), and the like, which are typical examples and are preferred. A suitable amount of the color developing agent which can be used ranges from about $2\times10^{-3}$ to about $2\times10^{-1}$ mol/liter.

In addition, compounds known as developer ingredients may be incorporated in the color developer. For example, sodium hydroxide, potassium hydroxide, sodium carbonate, potassium carbonate, sodium tertiary phosphate, potassium tertiary phosphate, potassium metaborate, borax, etc., individually or in combination, can be used as an alkali agent and a buffer agent. Further, various salts such as disodium or dipotassium hydrogen phosphate, potassium or sodium dihydrogen phosphate, sodium or potassium bicarbonate, boric acid, alkali metal nitrates, alkali metal sulfate, and the like are used for the purpose of improving the buffer capability, for convenience in preparation or for increasing the ionic strength.

Hydroxylamine or other compounds which serve for preventing oxidation of the developing agent, a so-called antioxidant, should be incorporated into the developer used in the process of this invention. Ascorbic acid, tetronic acid, tetronimide, 2-anilinoethanol, dihydroxyacetone, a pentose or hexose may be used in place of hydroxylamine, if desired.

If desired, optional development accelerators may be added to the color developer. For example, various pyridinium compounds and other cationic compounds represented by those described in U.S. Pat. No. 2,648,604, Japanese Patent Publication No. 9503/69 and U.S. Pat. No. 3,671,247, cationic dyes such as phenosafranine, neutral salts such as thallium nitrate or potassium nitrate, polyethylene glycol or derivatives thereof described in Japanese Patent Publication No. 9504/69, U.S. Pat. Nos. 2,533,990, 2,531,832, 2,950,970 and 2,577,127, nonionic compounds such as polythioethers, organic solvents and organic amines described in Japanese Patent Publication No. 9509/69 and Belgian Patent No. 682,862, ethanolamine, ethylenediamine, diethanolamine, and those described in L. F. A. Mason, Photographic Processing Chemistry, pp. 40 to 43, Focal Press, London (1966) may be used. In addition, benzyl alcohol and phenylethyl alcohol described in U.S. Pat. No. 2,515,147, pyridine, ammonia, hydrazine, amines, etc., described in Journal of Japanese Photographic Society, Vol. 14, p. 74 (1952) are also useful development accelerators.

Alkali metal sulfite such as sodium sulfite, potassium sulfite, potassium bisulfite or sodium bisulfite, ordinarily used as a preservative, may also be added to the developer. A suitable amount thereof can range from about $5\times10^{-3}$ to about $10^{-1}$ mol/liter (as $SO_3^{--}$).

In the present invention, optional anti-fogging agents may be added, if desired, to the color developer. Alkali metal halides such as potassium bromide, sodium bromide and potassium iodide, and organic anti-fogging agents may be used as the anti-fogging agent. Examples of organic anti-fogging agents which may be used include nitrogen-containing hetero ring compounds such as benzotriazole, 6-nitrobenzimidazole, 5-nitroisoindazole, 5-methylbenzotriazole, 5-nitrobenzotriazole, 5-chlorobenzotriazole, etc., mercapto-substituted hetero ring compounds such as 1-phenyl-5-mercaptotetrazole, 2-mercaptobenzimidazole, 2-mercaptobenzotriazole, etc., and mercapto-substituted aromatic compounds such as thiosalicylic acid. Of these, nitrogen-containing hetero ring compounds are preferred, with nitrogen-containing hetero ring compounds free of mercapto group substitution being particularly preferred. These compounds are used in an amount ranging from about 1 mg to about 5 g, preferably 5 mg to 1 g, per liter of the color developer.

In the case of reversal color processing, a competitive coupler, a fogging agent and an auxiliary developing agent can also be added to the color developer.

Examples of useful competitive couplers include citrazinic acid, J acid, H acid, etc. For example, those compounds which are described in U.S. Pat. No. 2,742,832, Japanese Patent Publication Nos. 9504/69, 9506/69, 9507/69, U.S. Pat. Nos. 3,520,690, 3,560,212, 3,645,735, etc., may be used.

Alkali metal borohydrides, amineborane, ethylenediamine, etc., may be used as the fogging agent. In addition, the compounds described in Japanese Patent Publication No. 38816/72 are useful.

As auxiliary developing agents, p-aminophenol, N-benzyl-p-aminophenol, 1-phenyl-3-pyrazolidone, etc., may be used. For example, the compounds described in Japanese Patent Publication Nos. 41475/70 and 19037/71 are useful.

The process of the present invention can be applied not only to the color photographic process wherein dye-forming couplers are incorporated in a light-sensitive material, as described in, e.g., U.S. Pat. Nos. 2,322,027, 2,376,679 and 2,801,171, but also to the color photographic process wherein couplers are incorporated in a developer, as described in, e.g., U.S. Pat. Nos. 2,252,718, 2,590,970 and 2,592,243.

At present, however, the former process is predominantly employed. Where dye-forming couplers are incorporated in a light-sensitive material, multi-layered light-sensitive materials are generally used. Therefore, it is desirable for the couplers to remain in a certan layer and not to diffuse into other layers during the production steps, storage and the processing steps.

The process of the present invention for processing color photographic materials can be applied to the diffusion transfer color photographic process using the process as described in U.S. Pat. Nos. 3,227,551 and 3,227,552. In this case, couplers may or must diffuse into other layers during the processing steps.

The process of the present invention is applicable to the system of the so-called coupler-in-developer development wherein couplers are present in a developer (e.g., as described in U.S. Pat. Nos. 2,252,718, 2,592,243 and 2,590,970) as well as the coupler-in-emulsion system wherein couplers are incorporated in a light-sensitive material (e.g., as described in U.S. Pat. Nos. 2,376,679, 2,322,027 and 2,180,171).

Thus, the process of the present invention is applicable to processing of any conventional silver halide color photographic materials including color negative films, color papers, color positive films and color reversal films.

In the process of the present invention, the fundamental processing steps for processing exposed color negative films, color positive films, color papers or the like are usually as follows.

(1) Color Development→Bleaching→Washing→Fixing→Washing→Stabilizing→Drying (2) Color Development→Bleach-Fixing→Washing →Stabilizing→Drying (3) Color Development→Stop-Fixing→Bleach-Fixing →Washing→Stabilizing→Drying In processes (1) to (3) above, a pre-bath or a hardening bath may further be provided before color development, and the stabilizing bath or washing after bleaching may be omitted.

On the other hand, the processing steps for color reversal films usually include the following fundamental steps.

(4) Black-and-White Development→Stopping→Washing→Fogging→Washing→Color Development →Bleaching→Washing→Fixing→Washing →Stabilizing→Drying (5) Black-and-White Development→Stopping→Washing→Fogging→Washing→Color Development→Bleach-Fixing→Washing→Stabilizing→Drying In processes (4) and (5) above, a pre-bath, a prehardening bath, a neutralizing bath, etc., may be included additionally, and a stabilizing bath, washing after bleaching, and the like may be omitted. The fogging bath may be replaced by a re-exposure, or may be omitted by adding a fogging agent (e.g., t-butylamineborane, sodium borohydride, tin-aminopolycarboxylic acid complex salt, etc.) to the color developer.

In the photographic processing of the present invention, the above-described processes (1) to (5) are useful. However, the present invention is not to be construed as being limited only to these processes.

Typical processing procedures (processing steps and color developer compositions) suitable for the present invention are shown below which, of course, are not intended to be interpreted as limiting the present invention in any way.

(1) Procedure for color negative processing:

| Processing Steps | |
|---|---|
| 1. Color Development | 3 min and 15 sec |
| 2. Bleaching | 6 min and 30 sec |
| 3. Washing | 3 min and 15 sec |
| 4. Fixing | 6 min and 30 sec |
| 5. Washing | 3 min and 15 sec |
| 6. Stabilizing | 3 min and 15 sec |

| Color Developer Composition | | |
|---|---|---|
| Compound (4)(60% aq. soln.) | 1 | ml |
| Hydroxylamine Sulfate | 4 | g |
| Sodium Sulfite | 4 | g |
| Sodium Carbonate | 30 | g |
| Potassium Bromide | 1.4 | g |
| 4-(N-Ethyl-N-β-hydroxyethylamino)-2-methylaniline Sulfate | 4.5 | g |
| Water to make | 1 | l |

As the bleaching solution, fixing solution and stabilizing solution, known solutions can be used.

(2) Procedure for color reversal processing:

| Processing Steps | Temperature (°C.) | Time (min) |
|---|---|---|
| First Development (black-and-white) | 30 | |
| Stopping Solution | " | 1 |
| Washing | " | 2 |
| Color Development | " | 7 |
| Stopping Solution | " | 2 |
| Hardening Bath | " | 2 |
| Washing | " | 2 |
| Bleach-Fixing Bath | " | 4 |

-continued

| Processing Steps | Temperature (°C.) | Time (min) |
|---|---|---|
| Washing | " | 2 |
| Fixing Bath | " | 4 |
| Washing | " | 2 |
| Drying | " | |

| Color Developer Composition | | |
|---|---|---|
| Compound (4)(60% aq. soln.) | 1 | ml |
| Benzyl Alcohol | 5 | ml |
| Sodium Hydroxide | 0.5 | g |
| Diethylene Glycol | 3 | ml |
| Sodium Sulfite | 2 | g |
| Potassium Bromide | 2 | g |
| 4-Amino-3-methyl-N-ethyl-β-hydroxy-ethylaniline Sesquisulfate (monohydrate) | 5 | g |
| Citraxinic Acid | 0.4 | g |
| Metaboric Acid | 0.5 | g |
| Ethylenediamine (70% aq. soln.) | 4 | ml |
| Sodium Metaborate (tetrahydrate) | 77 | g |
| Sodium Borohydride | 0.1 | g |
| Water to make | 1 | l |

As the first developer, stopping solution, hardening bath, bleaching bath and fixing bath, known compositions can be used.

(3) Procedure for processing color papers (color intensification):

| Processing Steps | Temperature (°C.) | Time | | |
|---|---|---|---|---|
| Color Development | 40 | 1 min | | |
| Intensification | " | 1 min | | |
| Washing | 26 | | | 30 sec |
| Bleach-Fixing | 40 | 1 min | | |
| Washing | 26 | 1 min | and | 30 sec |

| Color Developer Composition | | |
|---|---|---|
| Compound (4)(60% aq. soln.) | 1 | ml |
| Benzyl Alcohol | 15 | ml |
| Hydroxylamine Sulfate | 4 | g |
| Potassium Carbonate | 30 | g |
| Potassium Bromide | 0.4 | g |
| Potassium Sulfite | 4 | g |
| N-Ethyl-N-methoxyethyl-3-methyl-p-phenylenediaminedi-p-toluene-sulfonate | 7.5 | g |
| Water to make | 1 (pH 10.1) | l |

Color intensification as used herein means the process of using hydrogen peroxide or the like as described in, e.g., West German Patent Application (OLS) Nos. 1,813,920 (corresponding to U.S. Pat. No. 3,674,490), 1,950,102, 1,995,901, 1,961,029 (corresponding to U.S. Pat. No. 3,684,511), 2,044,833, 2,044,993 (corresponding to U.S. Pat. No. 3,761,265), 2,056,360 (corresponding to U.S. Pat. No. 3,776,730), 2,056,359 (corresponding to U.S. Pat. No. 3,765,890), and 2,120,091 (corresponding to U.S. Pat. No. 3,817,751). A typical composition of an intensifier is as follows.

| Intensifier | | |
|---|---|---|
| Hydrogen Peroxide (30% aq. soln.) | 30 | ml |
| Sodium Secondary Phosphate (dodecahydrate) | 36 | g |
| Sodium Pyrophosphate (heptahydrate) | 1 | g |
| Sodium Stannate | 0.1 | g |
| 6-Nitrobenzimidazole | 0.3 | g |
| Water to make | 1 (pH 9.0) | l |

The color developer in accordance with the present invention can be applied, in absolutely the same manner, to color intensification using a Co (III) complex as described in U.S. Pat. Nos. 3,826,652, 3,834,907, 3,748,138 and 3,765,819.

In the photographic processing of the present invention, known couplers may optionally be used as couplers for forming dye images. Couplers are in some cases incorporated in a color developer but, recently, they are generally incorporated in a photographic light-sensitive material. In many cases, couplers desirably possess a structure such that they remain in a particular layer and do not diffuse into other layers during production steps, storage of light-sensitive materials and processing steps. Couplers can be either 4-equivalent type couplers and 2-equivalent type couplers. In addition, they may be colored couplers for color correction, couplers forming colorless products (competing couplers) or couplers capable of releasing a development inhibitor upon development (the so-called DIR couplers).

Known open-chain ketomethylene couplers may be used as a yellow color-forming coupler. Of these, benzoylacetanilide type couplers and pivaloylacetanilide type couplers are advantageous. Specific examples of suitable yellow color-forming couplers include those described in U.S. Pat. Nos. 2,875,057, 3,265,506, 3,408,194, 3,551,155, 3,582,322, 3,725,072, 3,894,875, West German Patent Publication No. 1,547,868, West German Patent Application (OLS) Nos. 2,213,461, 2,219,917, 2,261,361, 2,263,875, 2,414,006, etc.

5-Pyrazolone compounds are predominantly used as a magenta coupler. Indazolone compounds and cyanoacetyl compounds are also suitable. Examples thereof are those described in U.S. Pat. Nos. 2,600,788, 2,983,608, 3,062,653, 3,127,269, 3,311,476, 3,419,391, 3,476,560, 3,519,429, 3,558,319, 3,582,322, 3,615,506, West German Patent No. 1,810,464, West German Patent Application (OLS) Nos. 2,408,665, 2,418,959, 2,424,467, Japanese Patent Publication Nos. 6031/65, 2016/69, etc.

Phenol or naphthol derivatives are mainly used as a cyan coupler. Specific examples thereof are those described in U.S. Pat. Nos. 2,369,929, 2,434,272, 2,474,293, 2,521,908, 2,895,826, 3,034,892, 3,311,476, 3,386,830, 3,458,315, 3,476,563, 3,583,971, 3,591,382, Japanese Patent Application (OPI) No. 78905/73, etc.

In addition, couplers capable of releasing a development inhibitor upon coupling reaction (the so-called DIR couplers) or compounds capable of releasing a development-inhibiting compound may be employed. Examples of these compounds are described in U.S. Pat. Nos. 3,227,554, 3,617,291, 3,632,345, 3,701,783, 3,790,384, British Patent No. 953,454, West German Patent Application (OLS) Nos. 2,414,006, 2,417,914, 2,417,945, 2,454,301, 2,454,329, U.S. Pat. Nos. 3,297,445, 3,379,529, etc.

In addition, those couplers which are described in Japanese Patent Application Nos. 37651/74, 99617/74, 66387/74, 92685/74, 98469/74, 114445/74, 1792/75, 70592/75, 96435/75, 118029/75, 118540/75 may also be used.

The above-described couplers and the like may be used as a combination of two or more thereof in the same layer in order to achieve the characteristics required for the light-sensitive materials, or it is of course possible to use the same compound in two or more different layers.

These couplers are generally dispersed in a silver halide photographic emulsion layer together with a solvent having a suitable polarity. Useful coupler solvents include tri-o-cresyl phosphate, trihexyl phosphate, dioctylbutyl phosphate, di-butyl phthalate, diethyllaurylamide, 2,4-diallylphenol, octyl benzoate, etc.

Color light-sensitive materials which can be processed according to the process of the present invention have, on a support, at least one silver halide emulsion layer, usually a red-sensitive silver halide emulsion layer, a green-sensitive silver halide emulsion layer and a blue-sensitive silver halide emulsion layer. Usually, they possess, on a support, at least one red-sensitive silver halide emulsion layer containing a cyan image-forming coupler, at least one green-sensitive silver halide emulsion layer containing a magenta image-forming coupler, and at least one blue-sensitive silver halide emulsion layer containing a yellow image-forming coupler. Such photographic elements may contain light-insensitive photographic layers (e.g., an antihalation layer, an intermediate layer for preventing color stain or the like, a yellow filter layer, a protective layer, etc.). In addition, the order of arrangement of the red-sensitive layer, the green-sensitive layer and the blue-sensitive layer is not particularly limited at all.

Color light-sensitive materials which can be processed according to the process of the present invention may contain, as a silver halide, silver bromide, silver chloride, silver chlorobromide, silver bromoiodide and/or silver chlorobromoiodide in a photographic emulsion layer. When two or more photographic emulsion layers are provided, two or more of these silver halides may be used in combination. Photographic emulsions can be prepared using known processes such as that described in P. Grafkides, Chimie Photographique, Paul Montel Paris (1967), and may employ any process such as the ammoniacal process, the neutral process, the acidic process, the single jet process, the reverse mixing process, the double jet process, the controlled double jet process, and the like.

The crystal form of these silver halide grains may be a cubic form, an octahedral form and a mixture thereof. As to the crystal structure of silver halide grains, those which have uniform structure to the core, those which have a layered structure wherein the inner part and the outer part are different from each other, and the so-called conversion type silver halide grains as described in British Patent No. 635,841 and U.S. Pat. No. 3,622,318 may be used. In addition, silver halide grains of the type which form latent images mainly on the surface thereof and internal latent image type which form latent images inside the grains may be used.

The silver halide emulsion may be chemically sensitized using known processes. For this purpose, for example, sulfur compounds as described in U.S. Pat. No. 1,574,944; gold compounds as described in U.S. Pat. No. 2,399,083, etc.; compounds of noble metals such as platinum, palladium, iridium, rhodium, ruthenium, etc., as described in U.S. Pat. No. 2,448,060, 2,598,079 and British Patent No. 618,061; reducing materials such as stannous salts, amines, etc., can be used.

Gelatin is usually used as a hydrophilic colloid in the silver halide emulsion layer and the other layers of the light-sensitive material which can be processed according to the present invention. Other hydrophilic colloids can also be used.

For example, gelatin derivatives; graft polymers of gelatin with other high polymer materials; cellulose derivatives such as hydroxyethyl cellulose, carboxymethyl cellulose, cellulose sulfate, etc.; saccharides such as sodium alginate, starch derivatives, etc.; various synthetic high polymers such as homopolymers or copolymers of polyvinyl alcohol, partially acetallized polyvinyl alcohol, poly-N-vinylpyrrolidone, polyacrylic acid, polymethacrylic acid, polyacrylamide, polyvinylimidazole, polyvinylpyrazole, etc., can be used.

Lime-processed gelatin is useful as the gelatin. In addition, useful acid-processed gelatin derivatives include, for example, a reaction product between gelatin and an acid halide, an acid anhydride or an isocyanate.

The light-sensitive material may further contain a hardener such as those described in U.S. Pat. No. 3,325,287, a plasticizer such as the compounds described in U.S. Pat. No. 3,775,128 or glycerin, a surface active agent such as an alkylbenzenesulfonic acid, an alkylene oxide condensate, the compounds described in U.S. Pat. Nos. 2,739,891 and 3,415,649, and like additives for improving the photographic properties, the image properties and the physical properties of light-sensitive materials.

The light-sensitive material which can be processed according to the present invention may contain, as a color fog-preventing agent, a hydroquinone derivative, an aminophenol derivative, a gallic acid derivative, an ascorbic acid derivative, etc. Specific examples thereof are described in U.S. Pat. Nos. 2,360,290, 2,336,327, 2,403,721, 2,418,613, 2,675,314, 2,701,197, 2,704,713, 2,728,659, 2,732,300, 2,735,765, Japanese Patent Application (OPI) Nos. 92988/75, 92989/75, 93298/75, 110337/75, Japanese Patent Publication No. 23813/75, etc.

The light-sensitive material which can be processed according to the present invention may contain, in a hydrophilic colloidal layer thereof, an ultraviolet light absorbing agent. For example, aryl group-substituted benzotriazole compounds (e.g., those described in U.S. Pat. No. 3,533,794), 4-thiazolidone compounds (e.g., those described in U.S. Pat. Nos. 3,314,794, 3,352,681), benzophenone compounds (e.g., those described in Japanese Patent Application (OPI) No. 2784/71), cinnamic acid esters (e.g., those described in U.S. Pat. Nos. 3,705,805 and 3,707,375), or benzoxazole compounds (e.g., those described in U.S. Pat. No. 3,499,762) can be used. Ultraviolet light absorbing couplers (e,.g., cyan dye-forming α-naphtholic couplers) or ultraviolet light absorbing polymers may be used as well. These ultraviolet light absorbing agents may be mordanted in a particular layer.

In the hydrophilic colloidal layer of the light-sensitive material which can be processed according to the present invention may be incorporated brightening agents of the stilbene series, the triazine series, the oxazole series or the coumarin series. These may be water-soluble, or it is also possible to use water-insoluble brightening agents in the form of a dispersion. Specific examples of fluorescent brightening agents are described in U.S. Pat. Nos. 2,632,701, 3,269,840, 3,359,102, British Patent No. 1,319,763, etc.

Exposure of the light-sensitive material for obtaining photographic images can be conducted in a conventional manner. That is, any of the various known light sources such as natural light (sunlight), a tungsten lamp, a fluorescent lamp, a mercury lamp, a xenon arc lamp, a carbon arc lamp, a xenon flash lamp, flying spots on a cathode ray tube, and the like may be used. Exposure time covers the range employed in a conventional camera (about $10^{-3}$ to 1 second and, in addition, exposure times of shorter than about [$10^{-}$] $10^{-3}$ second, for example, about $10^{-4}$ to about $10^{-6}$ second using a xenon flash lamp or a cathode ray tube, and exposure times of longer than about 1 second can be employed as well. The spectral composition of the exposure light may be adjusted, if necessary, by using a color filter. Laser light may also be used for exposure. In addition, the photographic material may be exposed to light emitted from a fluorescent substance excited by an electron beam, X-rays, gamma-rays, α-rays, or the like.

The phosphorus content of the phosphonocarboxylic acid compounds used in the present invention are compared below with that of compounds already known to be useful to some extent for the same objects as described above.

The numerals in the right column indicate the phosphorus content (ratio by weight of phosphorus in compound to compound weight).

| | |
|---|---|
| Sodium hexametaphosphate $(NaPO_3)_6$ | 0.304 |
| Sodium tetrapolyphosphate $Na_6P_4O_{13}$ | 0.264 |
| 1-Hydroxyethylidene-1,1-diphosphonic acid<br>$CH_3-C(PO_3H_2)_2-OH$ | 0.301 |
| 1-Aminoethane-1,1-diphosphonic acid<br>$CH_3-C(PO_3H_2)_2-NH_2$ | 0.302 |
| 1,1-Diphosphonopropane-2,3-dicarboxylic acid (present invention)<br>$CH_2-COOH$<br>$CH-COOH$<br>$CH(PO_3H_2)_2$ | 0.213 |
| 2-Phosphonobutane-2,3,4-tricarboxylic acid (present invention)<br>$CH_2-COOH$<br>$CH-COOH$<br>$CH_3-C(PO_3H_2)-COOH$ | 0.115 |
| *2-Phosphonobutane-1,2,4-tricarboxylic acid*<br>$CH_2-COOH$<br>$CH_2$<br>$HOOC-CH_2-C(PO_3H_2)-COOH$ | *0.115* |

The process of the present invention is superior to 50 conventional processes in the following points.

Firstly, the storage stability of the developer is remarkably improved, since oxidation of the color developing agent is effectively prevented.

Secondly, fog and color mixing caused by processing with an other than fresh developer are remarkably reduced.

Thirdly, the stability of the developer is remarkably high even in the presence of heavy metal ions such as iron ion.

Fourthly, the phosphorus compounds used in the invention do not inhibit coloration at all, thus sufficiently high color density being obtained.

Fifthly, since the phosphorus content is less than that of known inorganic and organic polyphosphoric compounds, the compounds used in this invention result in less environmental pollution even when present in waste water.

The present invention will now be illustrated in greater detail by the following examples of preferred embodiments of the present invention which, however, are not to be construed as limiting the present invention in any way. Unless otherwise indicated herein, all parts, percentages, ratios and the like are by weight.

EXAMPLE 1

On a polyethylene coated paper support were coated a blue-sensitive silver bromide emulsion layer containing a yellow coupler emulsion dispersion, a green-sensitive silver chlorobromide emulsion (AgCl: 70 mol%) layer containing a magenta coupler emulsion dispersion, a red-sensitive silver chlorobromide emulsion (silver chloride: 70 mol%) layer containing a cyan coupler emulsion dispersion, and a gelatin layer containing an ultraviolet light absorbing agent to prepare a color paper. Each coupler emulsion described above was prepared by dissolving each coupler in a mixture of dibutyl phthalate and tricresyl phosphate, and dispersing such in a gelatin solution as an o/w type emulsion using sorbitan monolaurate, Turkey red oil and sodium dodecylbenzenesulfonate as dispersing and emulsifying agents.

As the couplers, α-(2,4-dioxo-5,5'-dimethyloxazolidinyl)-α-pivaloyl-2-chloro-5-[α-(2,4-di-t-amylphenoxy)butyramido]acetanilide, 1-(2,4,6-trichlorophenyl)-3-[(2-chloro-5-tetradecanamido)anilino]-2-pyrazolon-5-one, and 2-[α-(2,4-di-t-amylphenoxy)-butanamido]-4,6-dichloro-5-methylphenol were respectively used. As the ultraviolet light absorbing agent, compound (a) having the following structural formula was used.

COMPOUND (a)

-continued

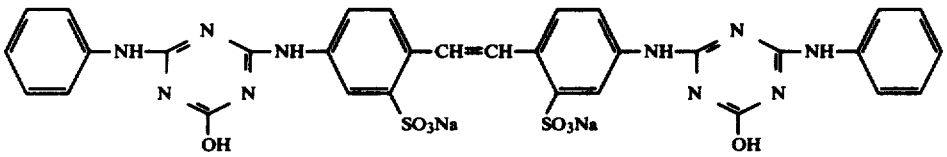

In the emulsion, 5-methyl-7-hydroxy-1,3,4-triazaindolizine was used as an anti-fogging agent.

The coated amounts of the couplers and silver salts were as follows.

| Layer | Amount of Coated Coupler ($g/m^2$) | Amount of Coated Silver Halide ($Ag \cdot g/m^2$) |
|---|---|---|
| Red-Sensitive Layer | 0.4 | 0.5 |
| Green-Sensitive Layer | 0.5 | 0.6 |
| Blue-Sensitive Layer | 0.4 | 0.8 |

This photographic element was exposed (1 second, 500 C.M.S.) using a sensitometer, then subjected to the following processings.

| Processing Steps | Temperature (°C.) | Time |
|---|---|---|
| Color Development | 31 | 3 min and 30 sec |
| Bleach-Fixing | " | 1 min and 30 sec |
| Washing | " | 2 min |
| Stabilizing | " | 1 min |

| Color Developer | | |
|---|---|---|
| Benzyl Alcohol | 14 | ml |
| Sodium Sulfite | 2 | g |
| Potassium Bromide | 0.5 | g |
| Sodium Carbonate (monohydrate) | 30 | g |
| 4-Amino-N-ethyl-N-(β-methanesulfonamido)-m-toluidine Sesquisulfate (monohydrate) | 5 | g |
| Additive (shown in Table 1 below) | | |
| Water to make | 1 | l |

The color developer of this composition was stored for 10 days at 31° C., and used for the development processing.

| Bleach-Fixing Solution | | |
|---|---|---|
| Ammonium Thiosulfate (70% aq. soln.) | 150 | ml |
| Sodium Sulfite | 5 | g |
| Na[FeIII(EDTA)] | 40 | g |
| EDTA | 4 | g |
| Water to make | 1 | l |

(EDTA stands for ethylenediaminetetraacetic acid.)

| Stabilizing Solution | | |
|---|---|---|
| Glacial Acetic Acid | 10 | ml |
| Sodium Acetate | 5 | g |
| Formaldehyde (37% aq. soln.) | 5 | ml |
| Water to make | 1 | l |

The optical reflection density on the thus processed color paper samples was measured through red, green and blue separation filters using an optical densitometer. The results of measuring the fog density are shown in Table 1 together with the additives present in the color developer. R, G and B indicate the densities obtained on measuring through red, green and blue filters, respectively.

TABLE 1

| Test No. | Additive | Amount of Additive | Fog Density R | G | B |
|---|---|---|---|---|---|
| 1 | None | — | 0.03 | 0.04 | 0.11 |
| 2 | Trisodium Nitrilotriacetate | 1.6 g/l | 0.03 | 0.06 | 0.12 |
| 3 | 1-Hydroxyethane-1,1-diphosphonic Acid (60% aq. soln.) | 2.1 cc/l | 0.01 | 0.03 | 0.10 |
| 4 | Compound [(4)] *(6)* (50% aq. soln.) | 2.1 cc/l | 0.01 | 0.03 | 0.10 |
| 5 | Compound (3) (50% aq. soln.) | 2.1 cc/l | 0.01 | 0.03 | 0.10 |

As can be seen from the experimental results, in conducting color development using an other than fresh developer, addition of Compound [(4)] *(6)* of the present invention caused clearly less fog as compared with the addition of no compound or of the nitrilotriacetate. The use of the other organic phosphonic acid compound (1-hydroxyethane-1,1-diphosphonic acid) which is outside the scope of the present invention, served to reduce fog in a similar manner to the present invention. However, when the developer contained a calcium salt, the developer containing this organic phosphonic acid compound formed a precipitate in a similar manner to the situation which occurred when the developer did not contain such a compound, thus such was not usable any more. The results of these comparative experiments are shown in the following Experimental Example 1.

EXPERIMENTAL EXAMPLE 1

To each of a color developer to which no compounds had been particularly added, a color developer to which a 60% aqueous solution of 1-hydroxyethane-1,1-diphosphonic acid had been added in an amount of 2.1 cc per liter, and a color developer to which a 50% aqueous solution of Compound [(4)] *(6)* of the present invention had been added was added 30 cc of a 0.1 mol calcium nitrate solution, and the mixture was allowed to stand for 3 days. The developers except for the developer containing Compound [(4)] *(6)* formed a white precipitate and were not practically usable any more.

EXPERIMENTAL EXAMPLE 2

The reduction in the amount of the developing agent and the hydroxylamine present in a color developer left for 10 days at 31° C. after being prepared as described in Example 1 was determined through analysis to obtain the results as given in Table 2 below.

TABLE 2

| Test No. | Additive to the Color Developer | Developing Agent (g/l) | Hydroxylamine (g/l) |
|---|---|---|---|
| 1 | None | 1.4 | 1.65 |
| 2 | Sodium Nitrilotriacetate | 1.4 | 3.1 |
| 3 | 1-Hydroxyethane-1,1-diphosphonic Acid | 1.3 | 1.4 |
| 4 | Compound [(4)] (6) | 1.2 | 1.4 |

According to the present invention, exhaustion of the developing agent and hydroxylamine in the developer with the lapse of time is small.

The quantitative analysis of the developing agent was conducted as follows. That is, the developing agent was extracted with ethyl acetate from the color developer and titrated with $Ce^{4+}$ using ferroin as an indicator.

The quantitative analysis of hydroxylamine was conducted as follows. That is, hydroxylamine was first converted to hydroxamic acid by adding ethyl acetate and colored with sulfuric acid-acidic ammonium ferric sultate, followed by a determination using an absorptiometric method.

EXAMPLE 2

On a cellulose triacetate film were provided a first layer through eighth layer to prepare a multi-layered light-sensitive material (Sample G).

FIRST LAYER (ANTIHALATION LAYER)

A gelatin layer containing black colloidal silver.

SECOND LAYER (INTERMEDIATE LAYER)

A gelatin layer containing a 2,5-di-t-octylhydroquinone emulsion dispersion.

| Third Layer (red-sensitive emulsion layer) | |
|---|---|
| Silver bromoiodide emulsion (AgI content:7 mol %) | Amount of coated silver $1.6\ g/m^2$ |
| Sensitizing Dye I | $3 \times 10^{-3}$ mol per mol Ag |
| Sensitizing Dye II | $3 \times 10^{-3}$ mol per mol Ag |
| Coupler A | 0.09 mol per mol Ag |
| Coupler B | 0.02 mol per mol Ag |

FOURTH LAYER (INTERMEDIATE LAYER)

The same as the Second Layer.

| Fifth layer (green-sensitive emulsion layer) | |
|---|---|
| Silver bromoiodide emulsion (AgI content:6 mol %) | Amount of coated silver $1.8\ g/m^2$ |
| Sensitizing Dye III | $2.5 \times 10^{-3}$ mol per mol Ag |
| Sensitizing Dye IV | $0.8 \times 10^{-3}$ mol per mol Ag |
| Coupler C | $3.5 \times 10^{-2}$ mol per mol Ag |
| Colored Coupider D | $1.5 \times 10^{-2}$ mol per mol Ag |

SIXTH LAYER (YELLOW FILTER LAYER)

A gelatin layer containing yellow colloidal silver and a 2,5-di-t-octylhydroquinone emulsion dispersion.

| Seventh Layer (blue-sensitive emulsion layer) | |
|---|---|
| Silver bromoiodide emulsion (AgI content:6 mol %) | Amount of coated siler $2.6\ g/m^2$ |
| Coupler E | 0.1 mol per mol of Ag |

EIGHTH LAYER (PROTECTIVE LAYER)

A gelatin layer.

Each layer contained a gelatin hardener, a coating aid, and the like in addition to the above-described components.

| Compounds Used in the Above Layers | |
|---|---|
| Sensitizing Dye I: | Anhydro-5,5-40 -dichloro-3,3'-disulfopropyl-9-ethyl-thiacarbocyanine hydroxide pyridinium salt |
| Sensitizing Dye II: | Anhydro-9-ethyl-3,3'-di-(3-sulfopropyl)-4,5,4',5'-dibenzothiacarbocyanine hydroxide triethylamine salt |
| Sensitizing Dye III: | Anhydro-9'-ethyl-5,5'-dichloro-3,3' disulfopropyloxacarbocyanine sodium salt |
| Sensitizing Dye IV: | Anhydro-5,6,5',6'-tetrachloro-1,1'-diethyl-3,3'-di(sulfopropoxyethoxyethyl)imidazolocarbocyanine hydroxide sodium salt |
| Coupler A: | 1-Hydroxy-N-[γ-(2,4-di-t-amylphenoxypropyl)]-2-naphthamide |
| Colored Coupler B: | 1-Hydroxy-4-[2-(2-hexyldecyloxycarbonyl)-phenylazo]-2-[N-(1-naphthal)]naphthamide |
| Coupler C: | 1-(2,4,6-Trichlorophenyl)-3-{3-[α-(2,4-di-t-amylphenoxy)acetamido]-benzamido}-5-pyrazolone |
| Colored Coupler D: | 1-(2,4,6-Trichlorophenyl)-3-{3-[α-(2,4-di-t-amylphenoxy)acetamido]-benzamido}-4-methoxyphenylazo-5-pyrazolone |
| Coupler E: | α-(2,4-Dioxo-5,5'-dimethyloxazolidinyl)-α-pivaloyl-2-chloro-5-[α-(2,4-di-t-amylphenoxy)butyramido]acetanilide |

This photographic element was exposed (1/50 second, 25 C.M.S.) using a sensitometer, and subjected to the development processing at 38° C. according to the following processing steps.

| | |
|---|---|
| 1. Color Development | 3 min and 15 sec |
| 2. Bleaching | 6 min and 30 sec |
| 3. Washing | 3 min and 15 sec |
| 4. Fixing | 6 min and 30 sec |
| 5. Washing | 3 min and 15 sec |
| 6. Stabilizing | 3 min and 15 sec |

The compositions of the processing solutions used in the respective steps were as follows

| Color Developer | | |
|---|---|---|
| Additive (as shown in Table 3) | | |
| Sodium Sulfite | 4.0 | g |
| Sodium Carbonate | 30.0 | g |
| Potassium Bromide | 1.4 | g |
| Hydroxylamine Sulfate | 2.4 | g |
| 4-(N-Ethyl-N-β-hydroxyethylamino)-2-methylaniline Sulfate | 4.5 | g |
| Water to make | 1 | l |

| Bleaching Solution | | |
|---|---|---|
| Ammonium Bromide | 160.0 | g |
| Ammonia (28% aq. soln.) | 25.0 | ml |
| Ethylenediaminetetraacetic Acid Sodium Iron Salt | 130 | g |
| Glacial Acetic Acid | 14 | ml |
| Water to make | 1 | l |

| Fixing Solution | | |
|---|---|---|
| Sodium Tetrapolyphosphate | 2.0 | g |
| Sodium Sulfite | 4.0 | g |
| Ammonium Thiosulfate (70% aq. soln.) | 175.0 | ml |
| Sodium Bisulfite | 4.6 | g |
| Water to make | 1 | l |

| Stabilizing Solution | | |
|---|---|---|
| Formaldehyde (40% aq. soln.) | 8.0 | ml |
| Water to make | 1 | l |

The color developer was prepared using water containing 3 ppm iron (III) ion. The additives for the color developer are given in Table 3 below. The optical transmission density of the thus processed color negative samples was measured through red, green and blue separation filters. Then, the developers were placed in reagent bottles and, after being left for 10 days at room temperature (25° C.) with a tight stopper, they were used for absolutely the same photographic processing to measure the density of the samples. The fog density formed by using the fresh solution and an other than fresh solution are shown in Table 3 below.

TABLE 3

| Test No. | Additive | Added Amount | Fog Density: Fresh Solution R | G | B | Other Than Fresh Solution R | G | B |
|---|---|---|---|---|---|---|---|---|
| 6 | None | — | 0.12 | 0.43 | 0.64 | 0.12 | 0.54 | 0.68 |
| 7 | Trisodium Nitrilotriacetate* | 2.0 g/l | 0.14 | 0.54 | 0.73 | 0.20 | 0.75 | 0.82 |
| 8 | Sodium Tetra-polyphosphate* | 4.0 g/l | 0.12 | 0.43 | 0.63 | 0.12 | 0.53 | 0.67 |
| 9 | 1-Hydroxyethane-1,1-diphosphonic Acid* (50% aq. soln.) | 4.0 ml/l | 0.12 | 0.43 | 0.63 | 0.12 | 0.54 | 0.67 |
| 10 | Compound [(4)] *(6)* (50% aq. soln.) | 4.0 ml/l | 0.12 | 0.42 | 0.62 | 0.12 | 0.45 | 0.64 |

Compounds marked with an asterisk are comparative compounds.

R, G and B stand for the optical densities measured through red, green and blue filters, respectively.

The developer containing Compound [(4)] *(6)* used in the present invention caused less fog when such was used after storage. On the other hand, the comparative compound, trisodium nitrilotriacetate, caused increased fog to a serious degree. When no additive was used or when comparative compounds, sodium tetrapolyphosphate and 1-hydroxyethane-1,1-diphosphonic acid, were used, the fog slightly increased and a precipitate was formed in the developer.

EXPERIMENTAL EXAMPLE 3

The reduction in amounts of the developing agent and hydroxylamine present in the other than fresh developer used in Example 2 was determined by analyzing such in the same manner as in Experimental Example 2 and the results obtained are shown in Table 4 below.

TABLE 4

| Test No. | Additive to Color Developer | Developing Agent (g/l) | Hydroxyl-amine (g/l) |
|---|---|---|---|
| 6 | None | 0.4 | 0.8 |
| 7 | Trisodium Nitrilotriacetate | 1.0 | 2.2 |
| 8 | Sodium Tetrapolyphospate | 0.4 | 0.7 |
| 9 | 1-Hydroxyethane-1,1-diphosphonic Acid | 0.3 | 0.7 |
| 10 | Compound [(4)] *(6)* | 0.2 | 0.3 |

While the invention has been described in detail and with reference to specific embodiments thereof, it will be apparent to one skilled in the art that various changes and modifications can be made therein without departing from the spirit and scope thereof.

What is claimed is:

1. A process for color photographic processing, which comprises subjecting an imagewise exposed silver halide color light-sensitive material to a color development using a color developer containing;
   (1) a p-phenylenediamine developing agent or derivative thereof and
   (2) at least one organic compound having at least one phosphono group and at least one carboxy group in the molecule selected from the group consisting of 2-phosphonobutane-1,2,4-tricarboxylic acid, 1-phosphonopropane-1,2, 3-tricarboxylic acid, 1-phosphonobutane-2,3,4-tricarboxylic acid, 1,1-diphosphonopropane-2,3-dicarboxylic acid, 2-phosphonobutane-2,3,4-tricarboxylic acid and 2,2-diphosphonobutane-3,4-dicarboxylic acid.

2. The process of claim 1, wherein said organic compound having at least one phosphono group and at least one carboxy group in the molecule is present in said color developer in an amount of about 0.01 g to about 50 g per liter of said color developer.

3. The process of claim 1, wherein said color developer has a pH ranging from about 7 to about 14.

[4. The process of claim 1, wherein said aromatic primary amine developing agent is a p-phenylenediamine derivative.]

5. The process of claim 1, wherein the color developer additionally contains a preservative.

6. The process of claim 5, wherein said preservative is hydroxylamine.

7. The process of claim 5, wherein said preservative is alkali metal sulfite.

8. The process of claim [4] *1*, wherein said p-phenylenediamine *derivative is N,N-diethyl-p-phenylenediamine* hydrochloride, 2-amino-5-diethylaminotoluene hydrochloride, 2-amino-5-(N-ethyl-N-laurylamino)toluene, 4-[N-ethyl-N-(β-hydroxyethyl- )amino]aniline sulfate, 2-methyl-4-[N-ethyl-N-(β-hydroxyethyl)amino]aniline sulfate, N-ethyl-N-(β-methanesulfoamidoethyl)-3-methyl-4-aminoaniline sesquisulfate monohydrate, N-(2-amino-5-diethylaminophenylethyl)methanesulfonamide sulfate, N,N-dimethyl-p-phenylenediamine hydrochloride, 4-amino-3-methyl-N-ethyl-N-methoxyethylaniline, [4-amino-3-methyl-N-ethyl-N-μ-ethoxyethylaniline] *4-amino-3-methyl-N-ethyl-N-β-ethoxyethylaniline,* 4-amino-3-methyl-N-ethyl-N-β-butoxyethylaniline or the salts thereof.

9. The process of claim 1, wherein said color developer additionally contains an alkali agent, a buffer agent, a development accelerator, a sulfite, and/or an anti-fogging agent.

10. The process of claim 6, wherein the color developer contains hydroxylamine in an amount ranging from about $1\times10^{-3}$ to about $5\times10^{-2}$ mol/l.

11. The process of claim 6, wherein said organic compound having at least one phosphono group and at least one carboxy group in the molecule is [2-phosphono-1,2,4-tricarboxylic acid] *2-phosphonobutane-1,2,4-tricarboxylic acid.*

12. The process of claim 1, wherein the color developer additionally contains hydroxylamine.

* * * * *